Dec. 3, 1968

O. O. GINGRAS 3,413,918

GRAVURE PROOF PRESS

Filed Sept. 27, 1965

Omer O. Gingras
INVENTOR.

BY *Clarence A. O'Brien*
and *Harvey B. Jackson*
Attorneys

Dec. 3, 1968   O. O. GINGRAS   3,413,918
GRAVURE PROOF PRESS
Filed Sept. 27, 1965   3 Sheets-Sheet 2

Omer O. Gingras
INVENTOR.

BY Clarence A. O'Brien
and Harvey B. Jackson
Attorneys

Dec. 3, 1968  O. O. GINGRAS  3,413,918
GRAVURE PROOF PRESS
Filed Sept. 27, 1965  3 Sheets-Sheet 3

Omer O. Gingras
INVENTOR.

BY Clarence A. O'Brien
and Harvey B. Jackson
Attorneys

United States Patent Office 3,413,918
Patented Dec. 3, 1968

3,413,918
GRAVURE PROOF PRESS
Omer O. Gingras, 749 New Ludlow Road,
South Hadley, Mass. 01075
Filed Sept. 27, 1965, Ser. No. 490,310
11 Claims. (Cl. 101—158)

ABSTRACT OF THE DISCLOSURE

A press including an elongated bed with means for supporting an image panel and a carriage mounted on the bed for guided movement therealong with a drum journaled from the carriage for rotation about an axis extending transversely of the bed and adapted to closely overroll the image panel upon movement of the carriage along the bed. A gear wheel is supported from the drum for concentric rotation therewith and a rack gear extends longitudinally of the bed and is supported at its opposite end portions from the bed for limited reciprocation laterally of a plane containing the axis of rotation of the drum and generally paralleling the path of movement of the carriage, the gear wheel means being meshed with the rack gear means and biasing means being operatively connected between the bed and opposite end portions of the rack gear means yieldingly urging the opposite end portions of the rack gear means toward the plane through which the axis of rotation of the drum moves during movement of the carriage along the bed.

---

This invention relates to a novel and useful gravure proof press and more specifically to a press specifically adapted to simulate full scale production printing on production equipment by the use of a small inexpensive press which may be either hand operated or driven by means of a relatively small power source.

In the not too distant past the printing industry had no adequate means other than production equipment for testing and sampling new patterns and color-stylings. The cost of plant sampling either on regular production cylinders or on "patch" rolls became prohibitive as stock and customer "exclusive patterns" multiplied at a high rate.

Since only a small percentage of design and color-styling concepts are ultimately worthy of full scale testing, it was found to be necessary to develop a practical inexpensive proofing laboratory method. A small one-color cylinder gravure press was first tried. This effort was unsuccessful since it was too time consuming and actually inadequate for certain needs, particularly for registered multicolor printings. A second and more recent attack to the problem was for engravers to use small flat etched copper plates prior to etching production cylinders. Small proofs, one to two feet square in size, were pulled on suitable paper stock by an offset method involving the transfer of the printed image from a hand inked and hand doctored etched plate by means of a manually operated gelatin composition roller. Exceptionally slow drying inks were used and the printed image was often quite different from that achieved on the plant presses. The method, however, was rapid, inexpensive and useful to the engraver although often misleading, due to distortion in the print caused by the unstable nature of the gelating rollers which were easily effected by temperature and humidity changes. Further, such a method was of little use to a printer in evaluating new production inks, substrates, or in color-styling new designs especially multicolor ones.

One of the more recent attacks at the problem of providing a means for satisfactory "gravure" proofing has been the provision of a small light duty hand operated proof press using etched flat copper plates and a spring loaded doctor blade supported from a carriage mounted for movement relative to the flat copper plates, the carriage also including a drum on which the paper or film to be printed could be mounted and which, when the carriage is moved relative to the copper plate, rollingly engages the paper to be printed with the etched plate. By utilizing an automatic doctor blade production inks could be used, sometimes with solvents slower than in production printing, and with care fairly good results could be obtained and multicolor jobs could be registered within a few thousandths of an inch in successive printing passes on a series of plates.

The gravure proof press of the instant invention is a press of the type mentioned immediately above but has incorporated therein certain improvements which will hereinafter become more fully apparent and which enable the press of the instant invention to obtain superior proof printing results.

The proof press of the instant invention is not to be considered as a production press as the printing of a single print from start to finish, including washup, takes slightly less than one minute. However, the press has great value in cases where one print or only a few prints are needed. Typical applications are as follows: (1) matching color to a given standard by making successive strike-offs with varying ink formulas; (2) comparing the relative printability of various types of stock; (3) checking progressives; (4) evaluation of new ink and top-lacquer systems or new substrates; (5) color-styling new wood grains or other decorative patterns for customer approval; and (6) checking various factors in photographic and etching processes that will show up on small scale prints.

The main object of this invention is to provide a gravure proof press which will be capable of proof printing single prints or only a few prints in the six applications mentioned immediately above as well as other applications in other related printing operations.

Another object of this invention is to provide a gravure proof press that may be readily operated in a manner to provide substantially the best results obtainable thereon by persons requiring a minimum amount of training on the operation of the proof press.

Still another object of this invention is to provide a proof press which may be utilized to obtain gravure proofs on various sheet stock material such as vinyls, papers, cloth, plastic and linoleum.

A final object to be specifically enumerated herein is to provide a gravure proof press in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 7:
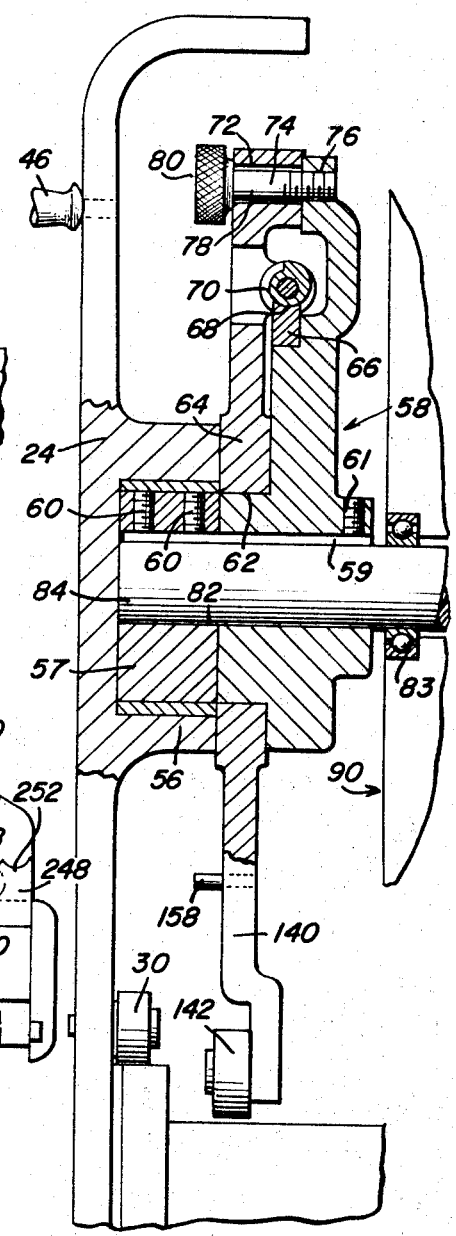
Figure 8:
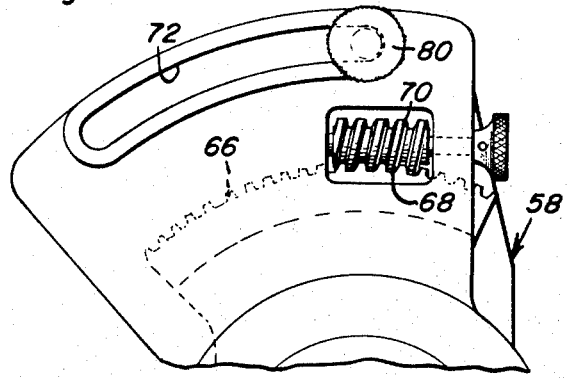

FIGURE 7 is a fragmentary enlarged end elevational view of the assembly by which one end of the proof supporting drum of the press is supported for rotation from the carriage of the press, portions of said assembly being broken away and shown in vertical transverse section; and FIGURE 8 is a fragmentary side elevational view of the upper portion of the structure illustrated in FIGURE 7 and as seen from the left side of FIGURE 7.

Referring now more specifically to the drawings the numeral 10 generally designates the proof press of the instant invention. The proof press 10 includes a support frame generally referred to by the reference number 12 including a pair of elongated longitudinally extending and generally parallel rails 14 and 16, the latter including a longitudinally extending horizontal ledge 18. A carriage generally referred to by the reference numeral 20 is provided and includes a pair of upstanding sides 22 and 24 interconnected in any convenient manner such as by transversely extending brace means 26 and mounted for movement along the rails 14 and 16 by means of corresponding pairs of opposite side front and rear upper rollers 28 and 30, lower rollers 32 and 34 and lower horizontal rollers 36 and 38. The horizontal rollers 36 and 38 are mounted for rotation about upstanding axes and the axes rotation of the rollers 36 and 38 are adjustably transversely of the rails 14 and 16, rails 14 and 16 including depending portions 40 with which each pair of corresponding rollers 36 and 38 rollingly engage. The rollers 28 and 30 are disposed in rolling engagement with the upper surfaces of the rails 14 and 16 and the lower rollers 32 and 34 are disposed in rolling engagement with the undersurfaces of the rails 14 and 16. Suitable opposite side stops 42 are carried by the frame 12 at the rear thereof for limiting rearward movement of the carriage 20 and a resilient stop 44 is carried by the forward end of each of the rails 14 and 16 and engageable by inturned flanges 45 at the forward extremities of the sides 22 and 24 to limit forward movement of the carriage 20 along the rails 14 and 16.

The side 24 is provided with a pair of handles 46 and 48 for manually effecting movement of the carriage 20 along the rails 14 and 16 and the frame 12 includes a table 49 having a side registering device 50 which is more or less conventional in design. Still further, the forwardmost extremities of the sides 22 and 24 include resilient rail scrapers 52 and 54 for maintaining the upper surfaces of the rails 14 and 16 free of foreign material.

The sides 22 and 24 of the carriage 20 include inwardly projecting bearing bosses 56 in which are pressed sleeves rotatably supporting bearings 57 having eccentric bores 82 formed therein. The opposite ends of a shaft 84 are received in and keyed to the bearings 57 by means of a key 59 and setscrews 60. A worm gear bracket generally referred to by the reference numeral 58 is keyed to the end of the shaft 84 adjacent the side 24 by means of the key 59 and a setscrew 61. The side of the worm gear bracket 58 adjacent the side 24 includes a bearing boss 62 on which there is journaled a worm bracket 64. The worm gear bracket 58 includes a rack gear 66 toothed as at 68 and the worm bracket 64 includes a manually operable worm gear 70 disposed in mesh with the rack gear 66. The worm bracket 64 is provided with an arcuate slot 72 having the center of the bearing pin 62 as its center of curvature. A thumb screw 74 is threadedly engaged in a threaded bore 76 formed in a peripheral portion of the worm gear bracket 58 registered with the slot 72 and the shank portion 78 of the thumb screw 74 is slidingly received in the slot 72 while the head portion 80 of the thumb screw 74 is engageable with the face of the worm bracket 64 remote from the worm gear bracket 58. Thus, after the worm gear bracket 58 is adjustably rotated relative to the worm bracket 64 by manually turning the worm gear 70, the thumb screw 74 may be tightened so as to clamp the slotted portion of the worm bracket 64 between the head portion 80 of the thumb screw 74 and the marginal portion of the worm gear bracket 58 in which the bore 76 is formed.

A drum assembly generally referred to by the reference numeral 90 is journaled in any convenient manner from the shaft 84 such as by bearings 83 supported from the opposite end portions of the shaft 84 disposed inwardly of the corresponding bearing pins rotatably journaling the opposite ends of the drum assembly 90 from the shaft 84. The drum assembly 90 includes somewhat conventional paper gripping means 92 and adjustable stops 94 for securing paper on which a proof is to be printed on the drum assembly 90 and the drum assembly 90 includes a gear wheel 96 fixed thereon and for rotation therewith which is meshed with an elongated rack gear 98 supported from the rail 14. The rack gear 98 is supported from the rail 14 in any convenient manner against movement longitudinally of the rail 14 but for limited vertical movement relative to the rail 14 and is spring urged toward an uppermost limit position by means of a plurality of compression springs 100 operatively connected between the rails 14 at a point spaced longitudinally therealong and corresponding points spaced longitudinally along the rack gear 98.

A foot actuator 102 is pivotally supported from the frame 12 as at 114 and is operatively connected to an actuating rod 116. The actuating rod 116 includes an abutment washer 118 acting as an abutment stop for one end of a compression spring 120 disposed about the rod 116 and the other end of the compression spring 120 is operatively engaged with one end of a lever 122 pivotally supported from the frame 12 as at 124 and including a hooked end 126 releasably engageable with a transverse member 128 carried by the carriage 20. Upon depression of the free end of the foot actuator 102 the compression spring 120 will be compressed so as to retain the transverse member 128 within the hooked end 126 of the lever 122 when the carriage 20 is disposed at the rearmost ends of the rails 14 and 16. In addition, the upper end of the actuating rod 116 is pivotally secured to one end of a second lever 130 which is pivotally supported from the frame 12 as at 132 and includes an end portion 134 remote from the rod 116 engageable with a portion 136 of the release mechanism for the paper gripping means or grippers 92 carried by the drum assembly 90. Therefore, downward movement of the free end of the foot actuator 102 will not only retain the carriage 20 at the rear end of the rails 14 and 16 but also actuate the gripper means or grippers 92 to release the paper gripped thereby.

The worm bracket 64 includes a depending arm portion 140 from whose lower terminal end a roller 142 is journaled. In addition, a V-shaped latch 144 is pivotally supported from the side 24 as at 146 and includes a pair of divergent arms 148 and 150. The arm 148 includes a terminal end having an arcuate cam surface 152 and the free end of the arm 150 is engageable with a narrow cam plate 154 mounted on the ledge 18 of the rail 16. Still, further, the free end portion of the arm 148 is also notched as at 156 and the arm portion 140 includes a laterally projecting pin 158 which is receivable in the notch 156 in a manner to be hereinafter more fully set forth.

The carriage 20 also includes a doctor blade assembly generally referred to by the reference numeral 160 including a shaft 162 whose opposite ends are journaled in bearings 164 carried by the sides 22 and 24 of the carriage 20. The shaft 162 has a doctor blade member 166 secured thereto in any convenient manner such as by fasteners 168 and the member 166 includes a pair of mounting plates 170 between one pair of corresponding edge portions of which a stiff but flexible doctor blade element 172 is clampingly secured, the plates 170 being clamped together and secured to the shaft 162 by means of the fasteners 168.

One end of the shaft 162 includes a transversely extending oscillatory movement limiting bar 174 and a lever arm 176 is journaled on the corresponding terminal end 178 of the shaft 162.

The lever arm 176 includes a laterally directed horizontally disposed flange 178 through which oscillatory movement limiting setscrews 180 are threadedly secured. The lower ends of the setscrews 180 are adapted to abuttingly engage corresponding opposite end portions of the bar 174 and it may also be seen that the lever arm 176 includes a lateral projection 182 which projects outwardly of the side of the lever arm 176 opposite from the side to which the flange 178 projects. The lever arm 176 is apertured as at 184 to rotatably receive the terminal end portion 178 and the latter is diametrically slotted as at 186 to receive the inner end 188 of a coil spring 190 whose outer end 192 is coiled as at 194 and anchored to a suitable anchor pin 196 carried by an adjusting knob 198 journaled from the side 24. The knob 198 and the side 24 include coacting detent means (not shown) for yieldingly retaining the knob 198 in adjusted rotated position relative to the side 24. Accordingly, it may be seen that the tension of the coil spring 190 may be adjusted so as to apply varied amounts of torque on the slotted end portion 178 of the shaft 162.

A doctor blade trip 200 which is generally V-shaped in configuration and includes a pair of divergent arms 202 and 204 is pivotally supported from the side 24 by means of a stub axle portion 206. The free terminal end portion of the arm 202 includes an arcuate cam surface 208 and the free terminal end portion of the arm 204 is notched as at 210 so as to provide an abutment surface 212 for engagement with the projection 182 in a manner hereinafter to be more fully set forth.

An apertured mounting plate 214 is rigidly supported between the rails 14 and 16 and a vacuum conduit 216 is provided and includes an inlet end 218 opening into a vacuum box 220 of which the plate 214 comprises a top. The vacuum line or conduit 216 is provided with a vacuum release valve 222 whereby the vacuum within the box 220 may be vented to the ambient atmosphere.

The side 24 also has a lever 226 mounted thereon which is also operatively connected to the portion 136 of the release mechanism for the grippers 92. Further, the stub axle portion 206 projects through the side 24 and has mounted thereon a knob 228 which may be manually actuated to release the doctor blade trip 200 at any time.

Mounted on the cam plate 154 is a block 232 which is engageable by the roller 142 and the arcuate cam surface 208 of the arm 202 of the doctor blade trip 200 is engageable with a cam plate 246 mounted on the rail 16. Still further, a roller 249 journaled on the free end of the lever arm 176 is engageable with an upstanding cam plate 248 carried by the forward end of the rail 16 and including an inclined ramp surface 250 leading up to a concave toe surface 252. Also, the roller 249 is also engageable with a doctor blade positioning cam 254 carried by the rail 16 and the roller 142 journaled from the arm portion 140 of the worm bracket 64 is engageable with a cam block 256 mounted on the rail 16.

Figure 1:
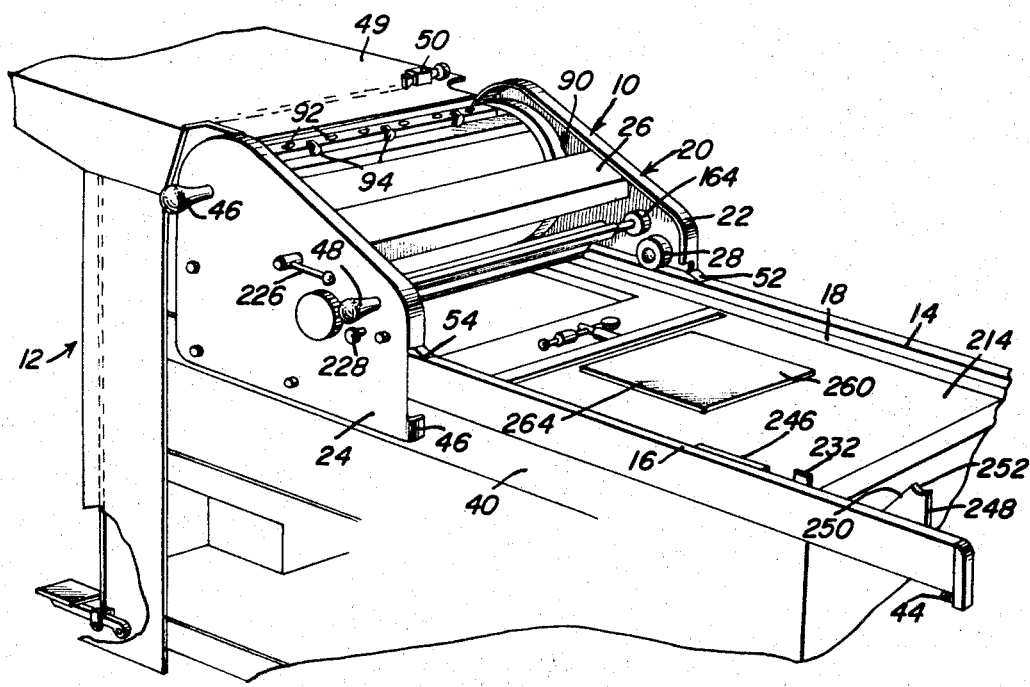
FIGURE 1 is a fragmentary perspective view of the gravure proof press of the instant invention shown with portions thereof being broken away.
Figure 2:
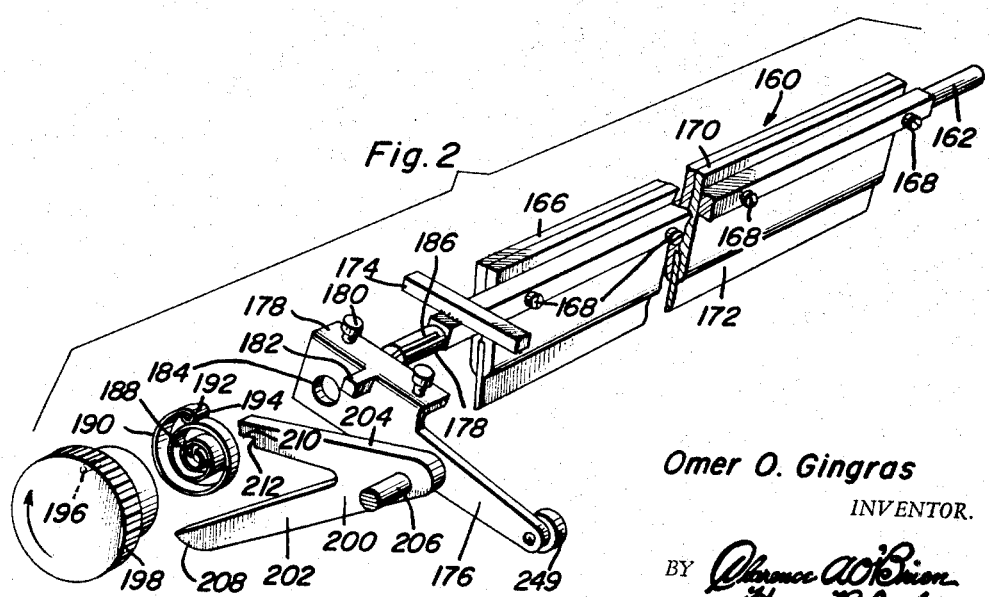
FIGURE 2 is an exploded perspective view of the doctor blade assembly of the proof press.
Figure 3:
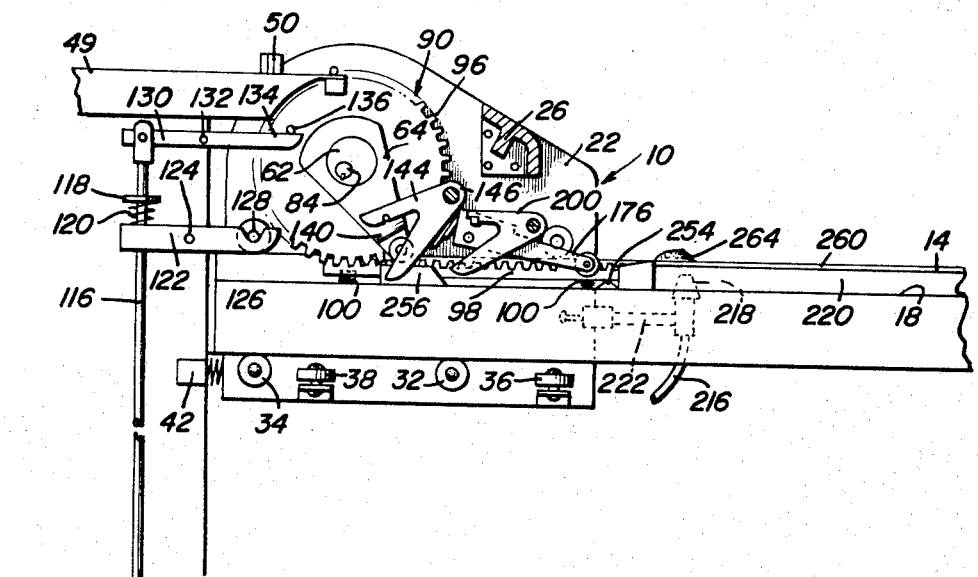
FIGURES 3–6 are fragmentary diagrammatic side elevational views of the gravure proof press shown with portions thereof broken away, removed and shown in vertical section to more clearly illustrate the structural and operational details of the proof press and with the carriage of the proof press in different positions of movement along the supporting rail means therefor.
Figure 4:
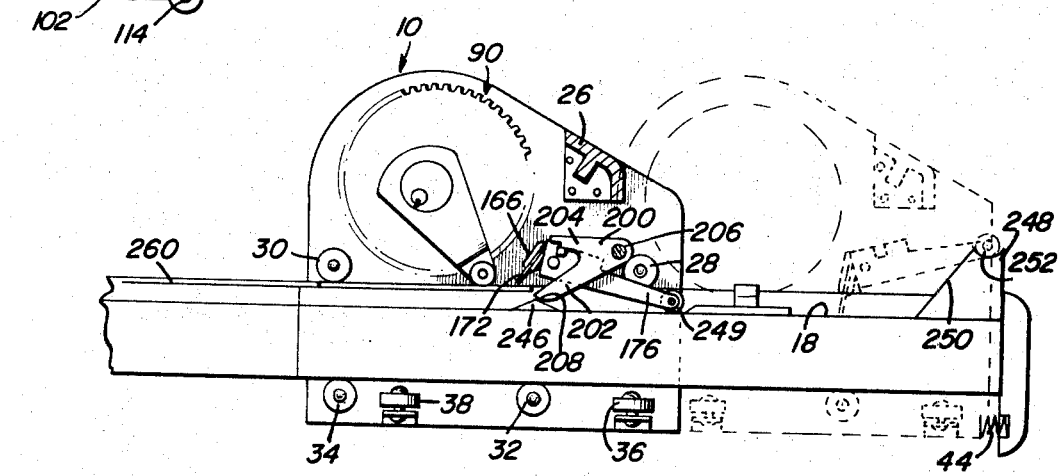
Figure 5:
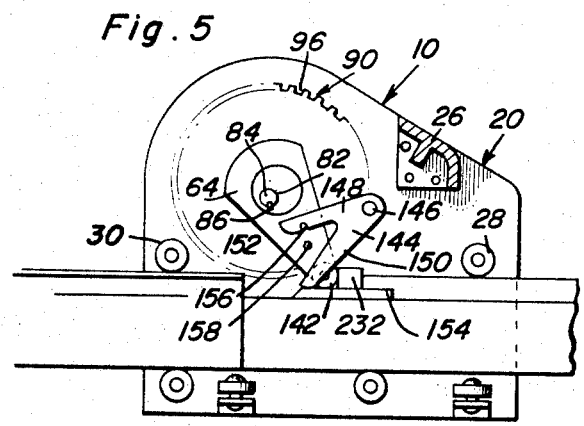
Figure 6:
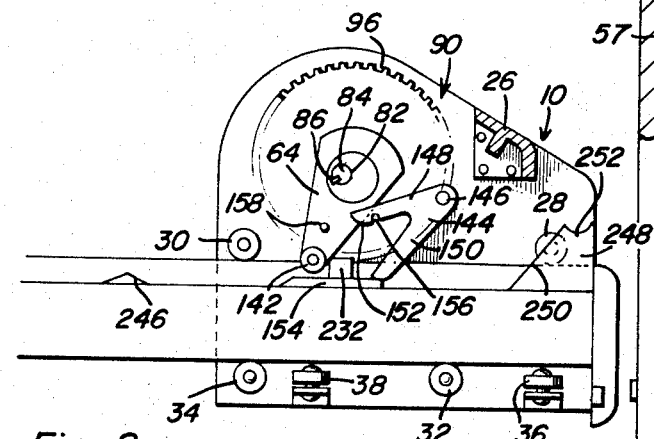

In operation, an etched copper plate 260 is first properly positioned on the mounting plate 314 and held in position thereon by means of the vacuum within the vacuum box 220. Thereafter, a suitable sheet of material which is to be printed is secured to the drum assembly 90 by opening the grippers 92, utilizing either the foot actuator 102 or the lever 226 after the adjustable stops 94 have been properly adjusted. Then, a quantity of the ink to be used is placed upon the plate 260 as at 264 and the carriage 20 is moved forwardly along the rails 14 and 16 by means of the handles 46 and 48. As the carriage 20 moves along the rails 14 and 16, the doctor blade element 182 is advanced toward the rear end of the plate 260 on which the ink 264 is disposed as the sheet secured to the drum assembly 90 is being wound on the drum. The doctor blade then smooths out the quantity of ink 264 by its travel across the etched upper surface of the plate 260 and the sheet attached to the drum assembly 90 is disposed in rolling contacting engagement with the etched plate 260 by means of the meshed engagement of the gear wheel 96 with the rack gear 98. Just prior to the doctor blade element 172 reaching the forward end of the plate 214 the arcuate cam surface 208 of the arm 202 engages the cam plate 246 so as to pivot the doctor blade trip 200 in a clockwise direction as viewed in FIGURE 4 of the drawings thereby moving the shoulder 212 out of registry with the projection 182 and enabling the spring 190 to pivot the lever arm 176 in a clockwise direction within the limits defined by the left setscrew 180 illustrated in FIGURE 2 of the drawings whereupon the doctor blade element 172 is lifted from engagement with the plate 214. Then, continued movement of the carriage 20 forwardly along the rails 14 and 16 will finish the process of rollingly engaging the paper to be printed with the plate 260 and will cause the lower free end portion of the arm 150 to engage the cam plate 154 so as to pivot the lever 144 in a clockwise direction as viewed in FIGURE 5 of the drawings withdrawing the notch 156 from the pin 158. Shortly thereafter, continued forward movement of the carriage 20 causes the roller 142 to engage the block or cam 232 so as to pivot the worm bracket in a clockwise direction relative to the carriage 20 from the position illustrated in FIGURE 5 of the drawings to the position illustrated in FIGURE 6 of the drawings thereby raising the shaft 84 and the drum assembly 90 journaled thereon. At this point the carriage 20 has engaged the limit or abutment stops 44 and is ready for return toward the rear end of the rails 14 and 16. However, final movement of the carriage 20 into its forwardmost position causes the roller 249 on the lever arm 176 to engage the ramp 250 of the cam plate 248 and to move up the ram surface 250 and into the concave toe 252 of the cam plate 248. This of course pivots the dictor blade member 166 and the doctor blade element 172 downwardly between the rails 14 and 16 whereby the lower edge portion of the doctor blade element 172 is disposed for ready wiping and cleaning.

As the carriage 20 is returned toward the rear ends of the rails 14 and 16, the roller 249 rolls down the ramp surface 250 engaging the projection with the shoulder 212. Thereafter, continued rearward movement of the carriage 20 will cause the surface 208 to engage the cam plate 246 thereby pivoting the trip 200 in a clockwise direction again moving the shoulder 212 out of registry with the projection 182 enabling the spring 190 to pivot the arm 176 in a clockwise direction whereupon the doctor blade element is lifted above the mounting plate 214 and the plate 260. Further movement of the carriage 20 toward the rear ends of the rails 14 and 16 causes the roller 142 of the lower end of the arm portion 140 to engage the cam block 256 thereby effecting counterclockwise rotation of the arm portion 140 relative to the carriage 20 and the shaft 84 on which the drum assembly 90 is mounted to be lowered to its original operative position. Still further, the pin 158 engages the arcuate cam surface 152 on the arm 148 during the above mentioned counter-clockwise rotation of the arm portion 140 relative to the carriage 20 and thereby causes the lever 144 to be slightly pivoted in a clockwise direction so as to bring the notch 156 into registry with pin 158 whereupon the arm 148 will drop so as to seat the pin 158 within the notch 156 to lock the arm portion 140 against rotation relative to the carriage 20 and thereby eliminate any varance in the elevation of the axis of rotation of the drum assembly 90. Still further, upon final movement of the carriage 20 toward the rear ends of the rails 14 and 16, the roller 249 on the free end of the lever arm 176 engages the cam 254 to again set the projection 182 within the notch 210 and in abutting engagement with the shoulder 212. This of course slightly lowers the doctor blade element 172 into its position for subsequent wiping of the plate 260.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A gravure proof press comprising an elongated bed, a carriage mounted on said bed for guided reciprocal movement therealong, support means adapted to removably support a gravure plate in stationary position on said bed, a drum journaled from said carriage for rotation about an axis extending transversely of said bed and adapted to rollingly engage said gravure plate upon movement of said carriage along said rail means, driving means operatively connecting said drum and said bed for effecting rotation of said drum at a peripheral speed equal to the linear speed of said carriage along said bed, bearing means journaled from opposite sides of said carriage, a shaft having its opposite end portions eccentrically supported from said bearing means and from which said drum is journaled, a first member eccentrically journaled on said shaft, a second member keyed to said shaft for rotation therewith, means operatively connected between said first and second members for angularly adjusting said first member relative to said second member, and coacting means carried by said first member and said bed operative to effect oscillation of said first member in response to movement of said carriage along said bed.

2. A gravure proof press comprising a bed including a pair of generally parallel elongated guide rail means, a carriage mounted on said bed for guided reciprocal movement along said guide rail means, support means adapted to removably support a gravure plate in stationary position between one pair of corresponding ends of said rail means, a drum journaled from said carriage for rotation about an axis extending transversely of said guide rail means and adapted to rollingly engage said gravure plate upon movement of said carriage to a position along said rail means, driving means operatively connecting said drum and said rail means for effecting rotation of said drum at a peripheral speed equal to the linear speed of said carriage along said rail means toward said one pair of corresponding ends of said rail means, and raising means operatively associated with said drum and said rail means to automatically raise the axis of rotation of said drum relative to said carriage in response to movement of said carriage in one direction past a first predetermined position, maintain said axis in a raised position during movement of said carriage past said first predetermined position in the other direction, and thereafter lower the axis of rotation of said drum in response to further movement of said carriage in the opposite direction, a doctor blade assembly supported from said carriage for reciprocal movement therewith along said rail means and also for up and down movement relative to said carriage between an upper position and a lower position as well as an operative intermediate position disposed between said upper and lower position, said doctor blade assembly when in its upper position being at an elevation adapted to clear said gravure plate when in its intermediate position being adapted to scrape the upper surface of said plate, and when at its lower position projecting downward between said rail means, coacting doctor blade positioning means carried by said carriage, said rail means, and said doctor blade assembly operative to automatically sequentially lower said doctor blade assembly from said upper position to said intermediate position in response to positioning of said carriage adjacent the other pair of ends of said rail means, raise said doctor blade from the intermediate position to said upper position in response to movement of said carriage toward said one pair of ends of said rail means past said support means, lower said doctor blade assembly from said upper position to said lower position in response to further movement of said carriage toward said one pair of ends of said rail means, and raise said doctor blade assembly from said lower position to said upper position in response to movement of said carriage from said one pair of ends toward the other set of ends of said rail means prior to being lowered from said upper position to said intermediate position in response to movement of said carriage to said other pair of ends of said rail means.

3. A gravure proof press comprising a bed including a pair of generally parallel elongated guide rail means, a carriage mounted on said bed for guided reciprocal movement along said guide rail means, support means adapted to removably support a gravure plate in stationary position between one pair of corresponding ends of said rail means, said carriage including means adapted to journal a drum therefrom for rolling engagement with said gravure plate, a doctor blade assembly supported from said carriage for reciprocal movement therewith along said rail means and also for up and down movement relative to said carriage between an upper position and a lower position as well as an operative intermediate position disposed between said upper and lower position, said doctor blade assembly when in its upper position being at an elevation adapted to clear said gravure plate, when in its intermediate position being adapted to scrape the upper surface of said plate, and when at its lower position projecting downward between said rails means, coacting doctor blade positioning means carried by said carriage, said rail means, said doctor blade assembly operative to automatically sequentially lower said doctor blade assembly from said upper position to said intermediate position in response to positioning of said carriage adjacent the other pair of ends of said rail means, raise said doctor blade from the intermediate position to said upper position in response to movement of said carriage toward said one pair of ends of said rail means past said support means, lower said doctor blade assembly from said upper position to said lower position in response to further movement of said carriage toward said one pair of ends of said rail means, and raise said doctor blade assembly from said lower position to said upper position in response to movement of said carriage from said one pair of ends toward the other set of ends of said rail means prior to being lowered from said upper position to said intermediate position in response to movement of said carriage to said other pair of ends of said rails means.

4. The combination of claim 3 wherein said support means comprises the top of a vacuum box supported between said rails, said top being suitably apertured so as to be adapted to secure said gravure plate thereon by vacuum.

5. The combination of claim 4 including means operatively associated with and operative to vent the interior of said box to the ambient atmosphere.

6. The combination of claim 1 wherein said driving means comprises a rack gear mounted on and extending along said bed and a gear wheel mounted for concentric rotation with said drum and disposed in meshed engagement with said rack gear.

7. A gravure proof press comprising a bed including a pair of generally parallel elongated guide rail means, a carriage mounted on said bed for guided reciprocal movement along said guide rail means, support means adapted to removably support a gravure plate in stationary position between one pair of corresponding ends of said rail means, a drum journaled from said carriage for rotation about an axis extending transversely of said guide rail means and adapted to rollingly engage said gravure plate upon movement of said carriage to a position along said rail means, driving means operatively connecting said drum and said rail means for effecting rotation of said drum at a peripheral speed equal to the linear speed of said carriage along said rail means toward said one pair of corresponding ends of said rail means, and raising means operatively associated with said drum and said rail means to automatically raise the axis of rotation of said drum relative to said carriage in response to movement of said carriage in one direction past a first predetermined position, maintain said axis in a raised position during movement of said carriage past said first predetermined position in the other direction, and thereafter lower the axis of rotation of said drum in response to further movement of said carriage in the opposite direction, said driving means comprising a rack gear mounted on and extending along one of said rail means and a gear wheel mounted for concentric rotation with said drum and disposed in meshed engagement with said rack gear, said rack gear being mounted on said one rail means for guided limited vertical reciprocation relative thereto but against longitudinal movement relative to said one rail means, and means operatively connected between said rack gear and said one rail means yieldingly urging said rack gear toward its uppermost position.

8. The combination of claim 3 wherein said doctor blade positioning means includes means operative to simultaneously adjust the height of said doctor blade assembly relative to said rail means in each of said raised, intermediate, and lowered positions thereof.

9. The combination of claim 3 wherein said doctor blade positioning means includes means operative to adjust the height of said doctor blade assembly relative to said rail means in said raised and intermediate positions independently of adjustment of said lowered position.

10. A gravure proof press comprising a bed including a pair of generally parallel elongated guide rail means, a carriage mounted on said bed for guided reciprocal movement along said guide rail means, support means adapted to removably support a gravure plate in stationary position between one pair of corresponding ends of said rail means, a drum journaled from said carriage for rotation about an axis extending transversely of said guide rail means and adapted to rollingly engage said gravure plate upon movement of said carriage to a position along said rail means, elongated rack gear means extending longitudinally of and supported at opposite end portions from one of said rail means for limited reciprocaiton lateraly of a plane generally paralleling said rail means and through which the axis of rotation of said drum is movable, gear wheel means supported from said drum for concentric rotation with the latter and meshed with said rack gear, and means operatively connected between said rail means and said opposite end portions of said rack gear yieldingly urging said opposite end portions toward said plane.

11. A gravure proof press comprising an elongated bed including support means adapted to removably support an inked image panel from said bed, a carriage mounted on said bed for guided movement therealong, a drum journaled from said carriage for rotation about an axis extending transversely of said bed and adapted to closely overroll said image panel, rack gear means extending longitudinally of and supported at opposite end portions from said bed for limited reciprocation laterally of a plane containing the axis of rotation of said drum and generally paralleling the path of movement of said carriage along said bed, gear wheel means supported from said drum for rotation therewith and meshed with said rack gear means, and means operatively connected between said bed and the opposite end portions of said rack gear means yieldingly urging said opposite end portions toward said plane.

References Cited

UNITED STATES PATENTS

| | | | |
|---|---|---|---|
| 1,934,750 | 11/1933 | Von Webern | 101—169 |
| 1,985,701 | 12/1934 | Vandercook et al. | 101—269 |
| 2,043,056 | 6/1936 | Mueller | 101—269 |
| 2,590,044 | 3/1952 | Schaller | 101—250 |

FOREIGN PATENTS

| | | |
|---|---|---|
| 175,045 | 2/1922 | Great Britain. |
| 225,321 | 12/1924 | Great Britain. |
| 712,543 | 7/1954 | Great Britain. |

ROBERT E. PULFREY, *Primary Examiner.*

J. R. FISHER, *Assistant Examiner.*